(No Model.)
J. KENNELLY.
VEHICLE WHEEL.
No. 420,075. Patented Jan. 28, 1890.
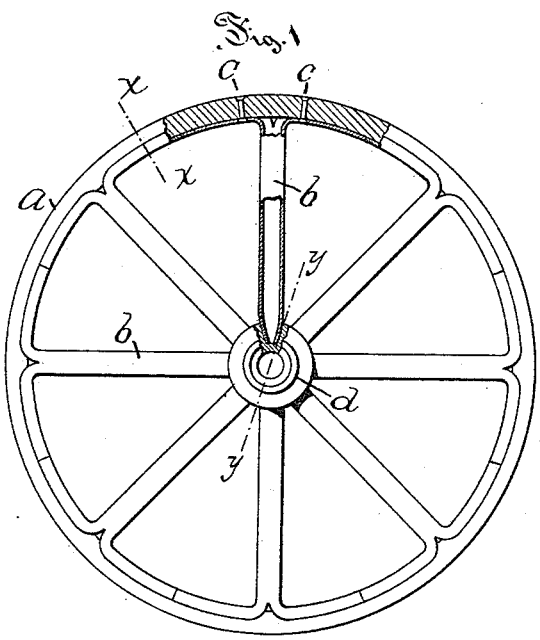
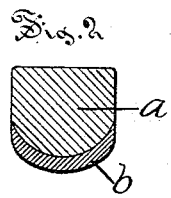
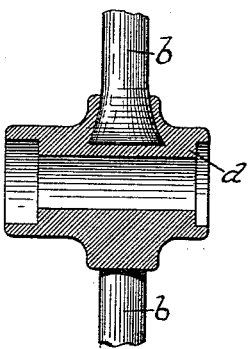
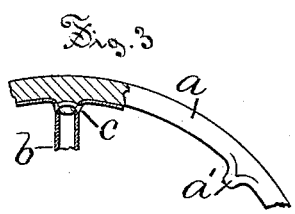
Witnesses:
W. M. Bjorkman
H. R. Williams
Inventor,
James Kennelly,
by Simonds & Burdett
Attys.

UNITED STATES PATENT OFFICE.

JAMES KENNELLY, OF HARTFORD, CONNECTICUT.

VEHICLE-WHEEL.

SPECIFICATION forming part of Letters Patent No. 420,075, dated January 28, 1890.

Application filed November 11, 1885. Serial No. 182,405. (No model.)

*To all whom it may concern:*

Be it known that I, JAMES KENNELLY, of Hartford, in the county of Hartford and State of Connecticut, have invented certain new and useful Improvements in Vehicle-Wheels, of which the following is a description, reference being had to the accompanying drawings, wherein—

Figure 1 is a plan view of a wheel made in accordance with my invention, with parts cut away to show construction. Fig. 2 is a detail view, in cross-section, of the wheel on plane denoted by line $x$ $x$ of Fig. 1. Fig. 3 is a detail side view of part of the rim or tire of a wheel, showing one feature of my improvement. Fig. 4 is a detail sectional view lengthwise of the hub, showing the widened and flattened inner end of a spoke on enlarged scale on plane $y$ $y$ of Fig. 1.

My invention relates to the class of vehicle-wheels that are composed wholly or mainly of metal; and the object of my invention is to produce a metallic wheel in which the metal shall be disposed in the several parts and so combined as to secure to the greatest extent lightness, durability, and strength, as well as comparative ease and cheapness of construction.

My invention consists in the combination of a rim or tire with the spokes, each of which consists of a metallic tube split part of the way along the outer end of its length, and with the split portion turned right and left from the point of junction of the spokes with the rim to which they are secured by riveting, and a hub in which the inner and flattened ends of the tubular spokes are firmly held by casting the hub about them, and in other details of the device, as more particularly hereinafter described and claimed.

In the accompanying drawings, the letter $a$ denotes the rim or tire of a wheel, that is made, preferably, of steel, formed in the shape of a ring by any ordinary process, as by bending and welding if of wrought metal, or casting if of cast metal, and this rim is preferably rounded on the back or inner side, as shown in section in Fig. 2.

The letter $b$ denotes the tubular spoke, which consists of a tube of any suitable metal, as steel, the outer end of the spoke being split for a certain distance and turned both ways into the general shape of a T, the arms, however, being curved, so as to conform to the inner side of the rim, against which they are closely fitted and to which they are secured, as by means of rivets $c$. These spokes are preferably so arranged that the ends of the arms meet about half-way between the point where the center of the spokes meet the rim or tire, and by abutting against each other add to the general strength of the wheel.

The inner end of each spoke is flattened, and is secured in the hub $d$ by casting the latter in proper shape for a certain distance about the spoke, so as to embrace this flattened end. The journal-box or opening through the hub may be formed by boring after casting, or it may be cored out and formed in the process of casting. Where the split portions of the spoke join the main portion or stem, there may be between the inner surfaces of the arms and the rear of the tire or rim an angular space, where the spoke does not fit closely against the rim, and in order to furnish a better bearing for the spoke on the rim at this point I make use of a tire or rim that is formed of a blank with integral projections $a'$, so formed in outline as to receive these surfaces of the spokes.

In prior wheels that are made with a tire of metal with outturned projections adapted to be fastened to the rim or felly the spoke in every instance has been made in two or more pieces lengthwise, even when these spoke-sections have been formed of parts of tubes, and such structures not only lack in strength and durability, but are expensive, owing to the labor required in making them.

In my improved wheel the spoke is formed of a metallic tube of any merchantable size, depending upon the size of the wheel in which it is to be used, and this tube is readily and cheaply split to form the arms, and the inner end is quickly and easily flattened or crimped in shape to be held in the hub.

In using the tire with inward projections $a'$, a rivet may be passed through and through this projection and through each branch of the spoke at about the point where they leave the main stem, and by riveting them to the arms at this point the spoke will be strengthened against any splitting strain caused by a load on the wheel.

The tubular form of the spoke insures the best disposition of a given amount of metal to resist compressing strain on the spoke, and it also offers the greatest amount of resistance to the strain that tends to buckle or bend the spoke, thus securing in the structure the greatest amount of strength in using a given amount of metal.

An advantge of the within-described method of securing the flattened end of the spoke in a cast hub is due to the fact that this flattened end is widened in one direction, as shown in Fig. 4, and this holds the spoke firmly in a hub against any force tending to pull it out.

I am aware that it is not new to unite the inner ends of the spokes of a metallic wheel by casting the hub about the spokes, and such features I do not broadly claim.

I claim as my improvement—

1. In a vehicle-wheel, in combination, a tire $a$, having integral projections $a'$, the tubular spokes $b$, with integral arms branching right and left from the point of contact of the spoke with the tire and secured thereto by riveting, and a hub cast to shape and embracing the inner ends of the spokes, all substantially as described.

2. In a vehicle-wheel, in combination, the tire $a$, having its inner face rounded and provided with integral projections $a'$, the tubular spokes $b$, with integral arms branching right and left each side of the integral projection on the tire, the rivet $c$, passing through both branches of the spoke and through the projection $a'$, and the metallic hub cast to shape and embracing the inner ends of the spokes, all substantially as described.

JAMES KENNELLY.

Witnesses:
CHAS. L. BURDETT,
H. R. WILLIAMS.